(12) United States Patent
Salomone et al.

(10) Patent No.: US 7,953,457 B2
(45) Date of Patent: May 31, 2011

(54) METHODS AND APPARATUS FOR REDUCING POWER CONSUMPTION FOR MOBILE DEVICES USING BROADCAST-TO-UNICAST MESSAGE CONVERSION

(75) Inventors: Leonardo Salomone, Waterloo (CA); Tom Nagy, Waterloo (CA); Matt Milardovic, Kitchener (CA); Arjuna Sivasithambaresa, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 932 days.

(21) Appl. No.: 11/413,880

(22) Filed: Apr. 28, 2006

(65) Prior Publication Data

US 2007/0254619 A1 Nov. 1, 2007

(51) Int. Cl.
*H04M 1/00* (2006.01)

(52) U.S. Cl. ............ 455/574; 455/343.3; 455/503; 370/311; 370/338; 370/352

(58) Field of Classification Search .......... 455/574, 455/343.1–343.5, 465, 503, 502, 525; 370/352, 370/311, 338, 449, 459, 473
See application file for complete search history.

(56) References Cited

U.S. PATENT DOCUMENTS

| | | | | |
|---|---|---|---|---|
| 6,018,642 | A * | 1/2000 | Adachi | 340/7.33 |
| 6,665,520 | B2 * | 12/2003 | Romans | 455/13.4 |
| 6,701,361 | B1 * | 3/2004 | Meier | 709/224 |
| 7,174,161 | B2 * | 2/2007 | Nakajima et al. | 455/411 |
| 7,424,007 | B2 * | 9/2008 | Meier et al. | 370/352 |
| 2002/0019215 | A1 * | 2/2002 | Romans | 455/69 |
| 2003/0043781 | A1 | 3/2003 | Proctor | |
| 2005/0018624 | A1 * | 1/2005 | Meier et al. | 370/318 |
| 2005/0233704 | A1 * | 10/2005 | Maekawa | 455/69 |
| 2005/0254444 | A1 * | 11/2005 | Meier et al. | 370/312 |
| 2006/0007924 | A1 * | 1/2006 | Sadot | 370/389 |
| 2006/0165031 | A1 * | 7/2006 | Wang et al. | 370/328 |
| 2007/0259700 | A1 * | 11/2007 | Meier et al. | 455/574 |
| 2007/0298836 | A1 * | 12/2007 | Yanover | 455/552.1 |

FOREIGN PATENT DOCUMENTS

| | | |
|---|---|---|
| EP | 1605636 A1 | 12/2005 |
| EP | 1684466 A1 | 7/2006 |
| EP | 1759543 B1 | 2/2009 |

OTHER PUBLICATIONS

Extended European Search Report, European Patent Application 06252282.6, Sep. 10, 2006.

(Continued)

*Primary Examiner* — Edward Urban
*Assistant Examiner* — RuiMeng Hu
(74) *Attorney, Agent, or Firm* — John J. Oskorep, Esq.

(57) ABSTRACT

Methods and apparatus for use in reducing power consumption in battery-powered mobile communication devices in wireless local area networks (WLANs) are described. In one illustrative example, a mobile device in a WLAN is configured to normally refrain from receiving broadcast messages so that it may remain in a low power mode of operation. A network server is configured to convert broadcast messages into unicast messages for receipt by the mobile device only if the message or protocol type of the broadcast message is one in which the mobile device needs to process. As the mobile device is still configured to receive unicast messages, it will receive and decode such a unicast message and process the broadcast information within it accordingly. Advantageously, battery power is conserved at the mobile device.

23 Claims, 6 Drawing Sheets

OTHER PUBLICATIONS

Kim et al, "Enhanced Power-sharing Mechanism For Broadcast And Multicast Service In WLAN", IEEE Communications letters, Dated Jun. 2005, pp. 520-522, vol. 9, No. 9.

NOKIA, "Recommendations For Reducing Power Consumption Of Always-on Applications", Forum Nokia, Dated Sep. 26, 2007, pp. 1-28, vol. 1.0.

* cited by examiner

METHODS AND APPARATUS FOR REDUCING POWER CONSUMPTION FOR MOBILE DEVICES USING BROADCAST-TO-UNICAST MESSAGE CONVERSION

BACKGROUND

1. Field of the Technology

The present application relates generally to mobile communication devices which communicate with wireless communication networks such as wireless local area networks (WLANs), and more particularly to configuring a mobile device to refrain from receiving and processing broadcast messages so that it may operate in a low power mode while configuring the network to convert broadcast messages needed by the mobile device into unicast messages for the mobile device.

2. Description of the Related Art

In wireless communication networks, such as wireless local area networks (WLANs) which operate in accordance with 802.11-based standards, broadcast messages of different types are sent to all mobile communication devices within a WLAN. Commonly, mobile communication devices will switch out of their low power mode to decode the broadcast messages and determine if they are of any interest to the device. Many of these mobile devices are battery-powered devices which need to efficiently utilize their batteries for extending operating time.

Broadcast messages transmitted from the WLAN may be one of several different message types, while the mobile communication device may accept broadcast messages of only some of the specific message types. Each time the mobile communication device switches out of low power mode to monitor an incoming message, it consumes an increased amount of battery power due to enabling additional receiver circuitry. This is wasteful when the broadcast messages are not of the type needed by the mobile communication device.

Accordingly, what are needed are methods and apparatus for the mobile communication device to switch out of low power mode only when the broadcast messages are needed for that mobile communication device.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

According to the present application, a battery-powered mobile device in a WLAN is configured to normally refrain from receiving broadcast messages so that it may remain in a low power mode of operation. A network server is configured to convert broadcast messages into unicast messages for receipt by the mobile device, only if the message or protocol type of the broadcast message is one in which the mobile device needs to process. As the mobile device is still configured to receive unicast messages, it will receive and decode such unicast messages and process the broadcast information within them accordingly. Advantageously, battery power is conserved at the mobile device.

Figure 1:
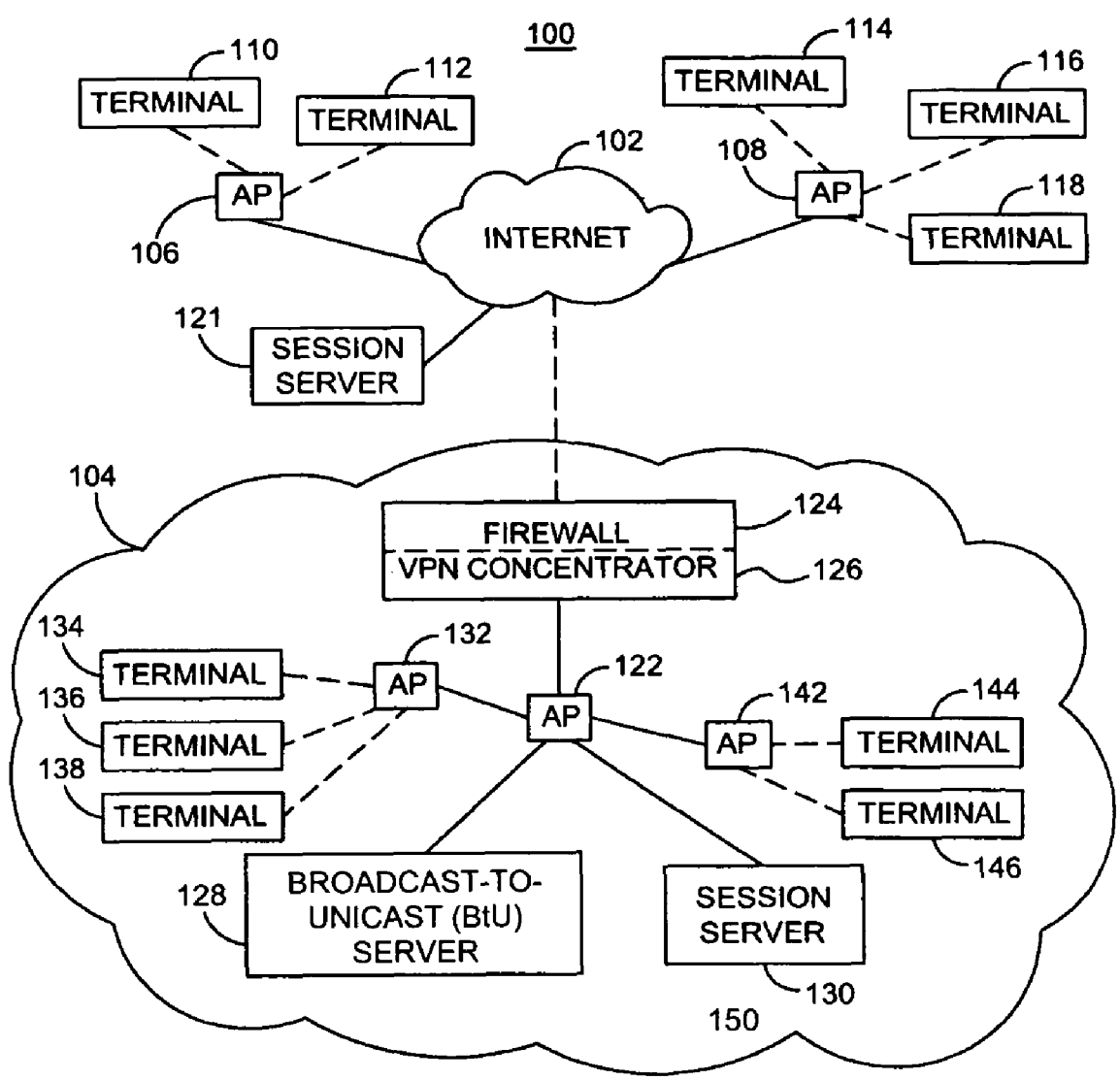
FIG. 1 is a block diagram which illustrates a communication system which includes one or more wireless communication networks (e.g. wireless local area networks (WLANs) and mobile terminals which operate in such networks.

FIG. 1 is a block diagram which illustrates a communication system 100 which includes a public network 102 (e.g. the Internet) and a private network 104. In the present embodiment, private network 104 is or includes a wireless local area network (WLAN). Terminals may connect to their associated networks through access points (APs) 106, 108, 122, 132, and 142 as shown. Preferably, at least some of the APs are wireless APs of the WLAN and at least some of the terminals are mobile/wireless communication devices which interface and connect through these wireless APs; such terminals and APs operate in accordance with well-known IEEE 802.11 standards. The terminals shown in public network 102 include terminals 110 and 112 which interface with AP 106, and terminals 114, 116, and 118 which interface with AP 108. The terminals shown in private network 104 include terminals 134, 136, 138 which interface with AP 132, and terminals 144 and 146 which interface with AP 142. Private network 104 is protected by a firewall 124 which may include a virtual private network (VPN) concentrator 126 for establishing and maintaining secure VPN connections for terminals outside of private network 104.

Private network 104 which includes the WLAN provides various data and communication services to its terminals. For example, private network 104 may provide for voice telephony communication services for its terminals with use of Voice over IP (VoIP) communications. For these types of services, private network 104 may utilize servers such as a VoIP server or an e-mail server, as examples. Communication system 100 may also include at least one session server which is a session initiation protocol (SIP) server. In the present embodiment, communication system 100 has a session server 121 in public network 102 and a session server 130 in private network 104. Note that some communication applications utilized by terminals, such VoIP applications, require the use of SIP. SIP is well-documented in standard documents such as Request For Comments (RFC) 3261.

Private network 104 also has a broadcast-to-unicast (BtU) server 128 which assists in converting broadcast messages to unicast messages for mobile terminals according to the present application, which is described in more detail below in relation to FIGS. 3-7. BtU server 128 utilizes a BtU server database 150 which contains terminal or client information that is pertinent for converting and sending broadcast messages as unicast messages. BtU server 128 and database 150 are described in more detail below in relation to FIGS. 6-7.

Figure 2:
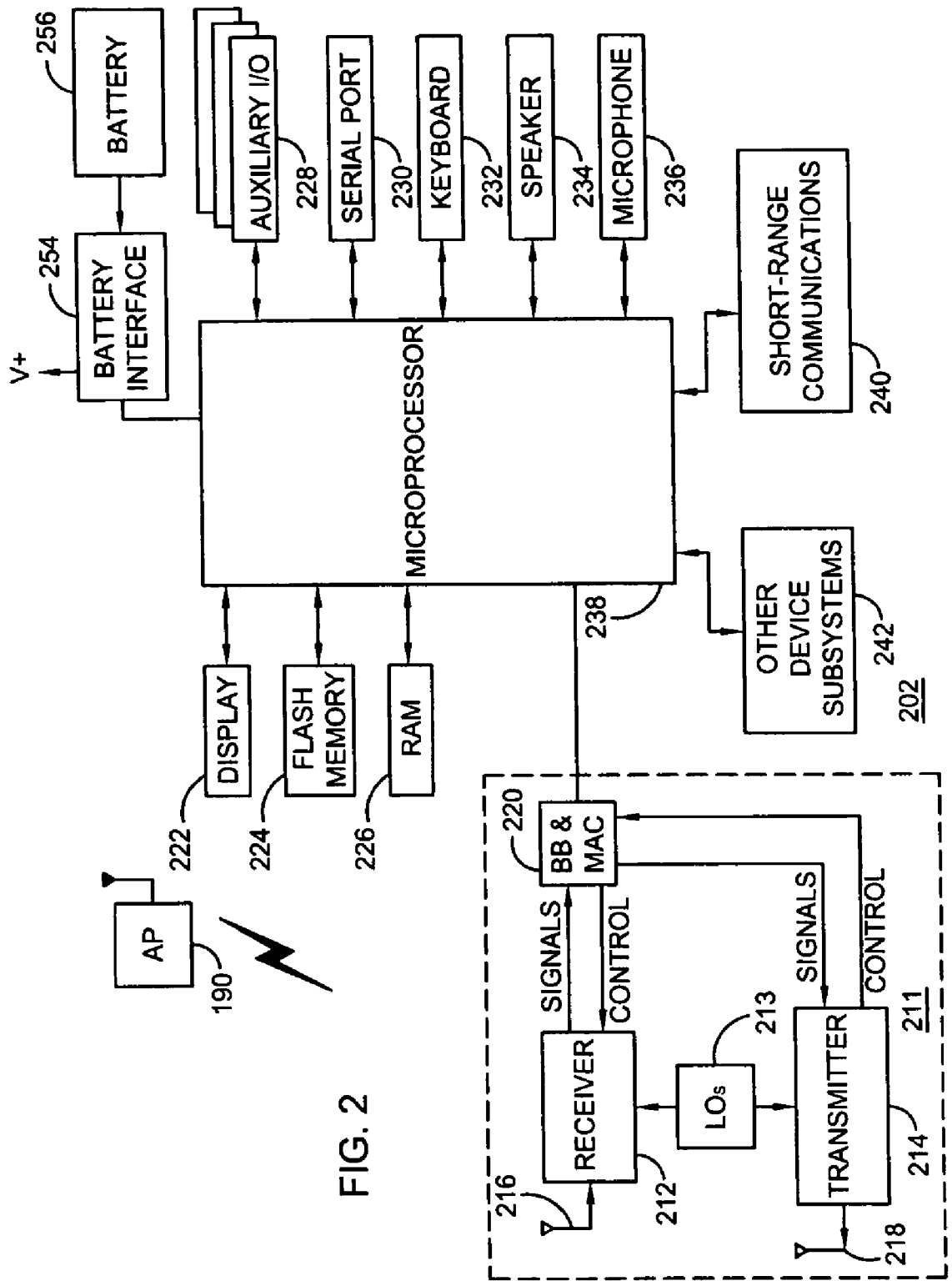
FIG. 2 is a more detailed schematic diagram of a mobile terminal in the WLAN FIG. 1, namely, a mobile station of the preferred embodiment.

Referring now to FIG. 2, electrical components of a typical mobile station (MS) 202 (one type of mobile terminal of FIG. 1) which operates with wireless APs of communication system 100 of FIG. 1 will be described. Mobile station 202 is preferably a two-way communication device having at least voice and advanced data communication capabilities, including the capability to communicate with other computer systems. Also preferably, mobile station 202 is a wireless communication device which operates in accordance with an IEEE 802.11 standards. Depending on the functionality provided by mobile station 202, it may be referred to as a data messaging device, a two-way pager, a cellular telephone with data messaging capabilities, a wireless Internet appliance, or a data communication device (with or without telephony capabilities).

As shown in FIG. 2, mobile station 202 is adapted to wirelessly communicate with AP 190 which may be a wireless AP of the present application. For communication with AP 190, mobile station 202 utilizes communication subsystem 211. Depending on the type of device, mobile station 202 may also be adapted to wirelessly communicate with other systems such as cellular telecommunication systems. With such configuration, mobile station 202 may be referred to as a "dual mode" mobile station. Although mobile station 202 may have separate and independent subsystems for these purposes, at least some portions or components of these otherwise different subsystems may be shared where possible.

Communication subsystem 211 includes a receiver 212, a transmitter 214, and associated components, such as one or more (preferably embedded or internal) antenna elements 216 and 218, local oscillators (LOs) 213, and a processing module such as a baseband (BB) and media access control (MAC) processing module 220. As will be apparent to those skilled in the field of communications, the particular design of communication subsystem 211 depends on the communication network in which mobile station 202 is intended to operate. In the present application, communication subsystem 211 (including its associated processor/processing components) are operative in accordance with IEEE 802.11 standards.

Mobile station 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile station 202 is a portable battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) that provides power V+ to all of the circuitry.

Mobile station 202 includes a microprocessor 238 (one type of processor or controller) that controls overall operation of mobile station 202. This control includes the broadcast-to-unicast (BtU) techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications that control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station and a removable memory module, such as a Subscriber Identity Module (SIM) (not shown), to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on mobile station 202 with respect to such items. This is especially advantageous where the host computer system is the wireless device user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication. Short-range communications subsystem 240 of FIG. 2 is an additional optional component that provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile station 202 has just been described, any suitable mobile communication device or terminal may be part of the inventive methods and apparatus which will be described in fuller detail below. Note that many components of mobile station 202 shown and described may not be included (e.g. a full QWERTY keypad may be optional).

According to the present application, a mobile terminal (e.g. terminal 134 of FIG. 1) is configured to normally refrain from receiving broadcast messages so that it may remain in a low power mode. A network server (e.g. BtU server 128 of FIG. 1) is configured to convert certain broadcast messages into unicast messages for receipt by the mobile terminal only if the message or protocol type (e.g. sub network access protocol (SNAP) type) of the broadcast message is one which the mobile terminal is configured to process. Since it is coupled within the same network, the network server receives all of the same broadcast messages intended for receipt by mobile terminals. Broadcast messages have a destination MAC address of "FF:FF:FF:FF:FF:FF" and therefore are discernible by the network server and mobile terminals. As the mobile terminal is still configured to receive unicast messages, it will therefore receive and decode these special unicast messages and process the broadcast information within them accordingly.

In general, a mobile terminal needs to receive a broadcast message of a particular type only if it is programmed to process such message to achieve a particular application result (i.e. it has an application program for processing the broadcast message). Examples of different types of broadcast messages in this particular environment (e.g. environment using SNAP types) include Internet protocol (IP) types, address resolution protocol (ARP) types, extensible authentication protocol over LAN (EAPOL) types, Intel types, and network basic input/output system (NetBIOS) types (Microsoft), to name but a few. Such messages are communicated in layer two (i.e. the data link layer) or layer three (i.e. the network layer) associated with the open system interconnection (OSI) seven-layer model.

Figure 3:
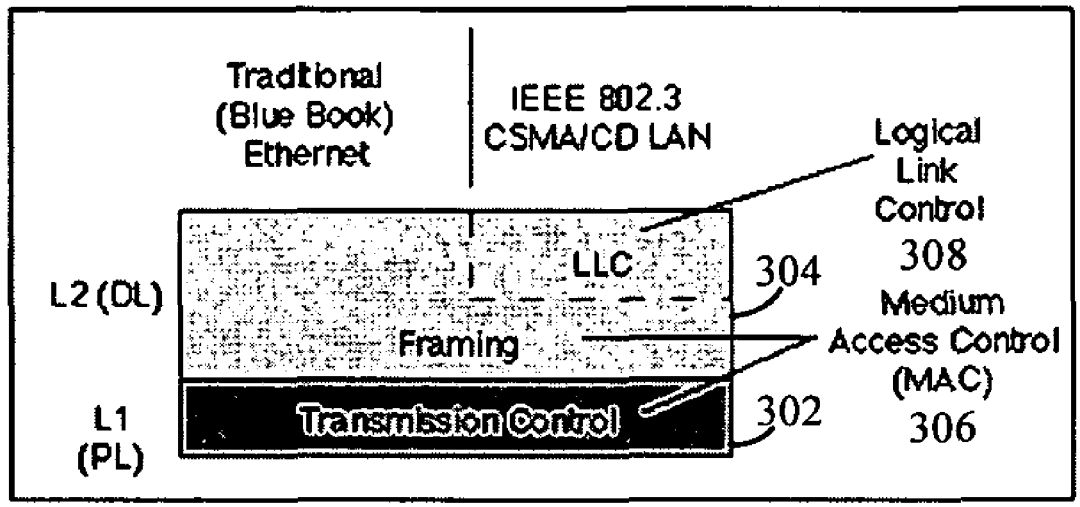
FIG. 3 is an illustration showing relevant layers of common standard protocols for messages used in the WLAN.

To help further illustrate such messaging, FIG. 3 is an illustration showing pertinent layers 300 of common Institute of Electrical and Electronics Engineers (IEEE) communication standard protocols for the communication of messages. It will be apparent to those skilled in art that such protocols will be adapted to a particular network or networks in which mobile terminals are intended to operate. A transmission control function 302 shown in layer one (L1) is in the physical layer (PL) of the OSI model. A framing function 304 shown in layer two (L2) is in the data link (DL) layer. The IEEE 802.3 standard for Ethernet communication defines an additional data link layer protocol called Logical Link Control (LLC) protocol 308 which is in L2. The IEEE 802.11 standard for Ethernet uses the same LLC protocol 308 that was defined for IEEE 802.3 standard for Ethernet. The LLC protocol 308 operates on top of a media access control (MAC) protocol 306 defined in original Ethernet standard. When LLC protocol 308 is used, the MAC layer service data unit (SDU), also called the message payload data, is further encapsulated, which adds two additional headers.

Figure 4:
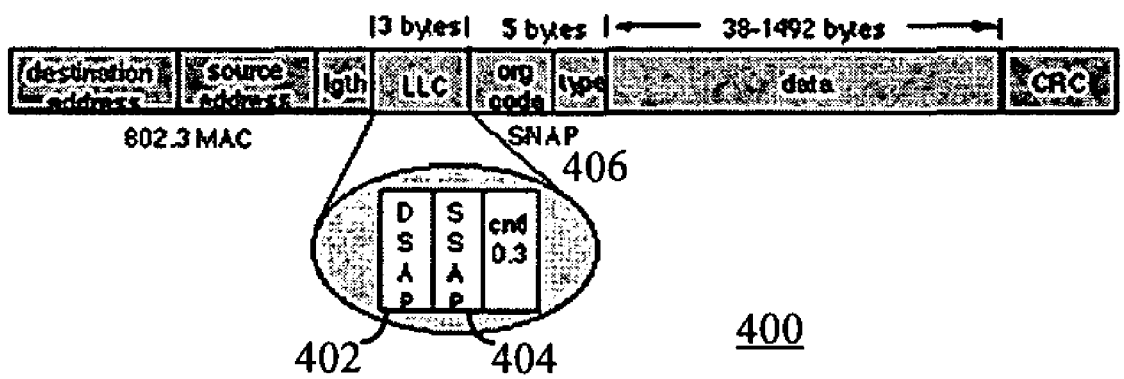
FIG. 4 is an illustration of frame formatting for messages in used in the WLAN.

FIG. 4 is an illustration of a frame format structure 400 of an IEEE 802.3 physical channel. The IEEE 802.3 standard defines Ethernet protocol, which is also used to define 802.11 WLAN standards. Each block in frame format structure 400 represents a series of data bits that show a specific structure of an 802.3 communicated signal. Each series of data bits consumes a specified time during each transmission as defined in 802.3 standards documents. Therefore, the bit pattern blocks shown in each row of frame format structure 400 are time-dependent-place-holders containing data bits. A logical link control (LLC) protocol is based on high level data link control (HDLC) protocol and uses an extended 2-byte address. A first address byte indicates a destination service access point (DSAP) address 402 and a second address byte indicates a source service access point (SSAP) address 404. The address bytes identify the network protocol entities which use link layer service. A control field is also provided which may support a number of HDLC modes, such as Type 1 (connection-less link protocol), Type 2 (connection-oriented protocol) and Type 3 (connection-less acknowledged protocol).

A sub network access protocol (SNAP) header 406 is used when the LLC protocol carries IP packets and contains information which would otherwise have been carried in the 2-byte MAC frame type field. Note that since the maximum size of an Ethernet frame is fixed, the maximum size of SDU is reduced to 1492 bytes (the maximum transmission unit (MTU) in IP) when LLC/SNAP encapsulation is used. The SNAP is a standard for the transmission of IP datagrams over IEEE 802 type networks. IP datagrams may be sent on IEEE 802 networks encapsulated within the LLC and SNAP data link layers (L2) and the physical network layers (L3). The SNAP is included in an extension of the LLC header and is used for encapsulating IP datagrams and ARP requests, and replies on IEEE 802 networks. The SNAP header follows the LLC header and contains an organization code indicating that the following 16 bits specify an EtherType code. The mapping of 32-bit Internet addresses to 16 or 48 bit IEEE 802 addresses is done using a dynamic discovery procedure of the ARP. IEEE 802 networks may have 16-bit or 48-bit physical addresses. The SNAP allows use of either size of address within a given IEEE 802 network. The SNAP header contains 40 bits of which 24 bits are an IEEE-assigned Organizationally Unique Identifier (OUI), and 16 bits are a Protocol Identifier (PID). The Internet Assigned Numbers Authority (IANA) OUI, 00-00-5E, may be used in SNAP headers with the appropriate PID to identify the protocols.

Mobile communication devices, such as mobile terminal 134 of FIG. 1, may be configured to process broadcast messages associated with a limited number of message or protocol types (e.g. different SNAP types). There are many different possible types of broadcast messages which are broadcasted in the network, and many different mobile terminals that will are configured to process any one or all of the several different message types. For example, a mobile terminal may be required to receive and process broadcast messages having SNAP types associated with ARP and IP, but not those broadcast messages associated with any other SNAP types such as NetBIOS and Intel. A mobile device configured to receive broadcast messages having SNAP types associated with NetBIOS, for example, may be viewed a nuisance to other mobile terminals in the network that have no need to process such messages.

Figure 5:
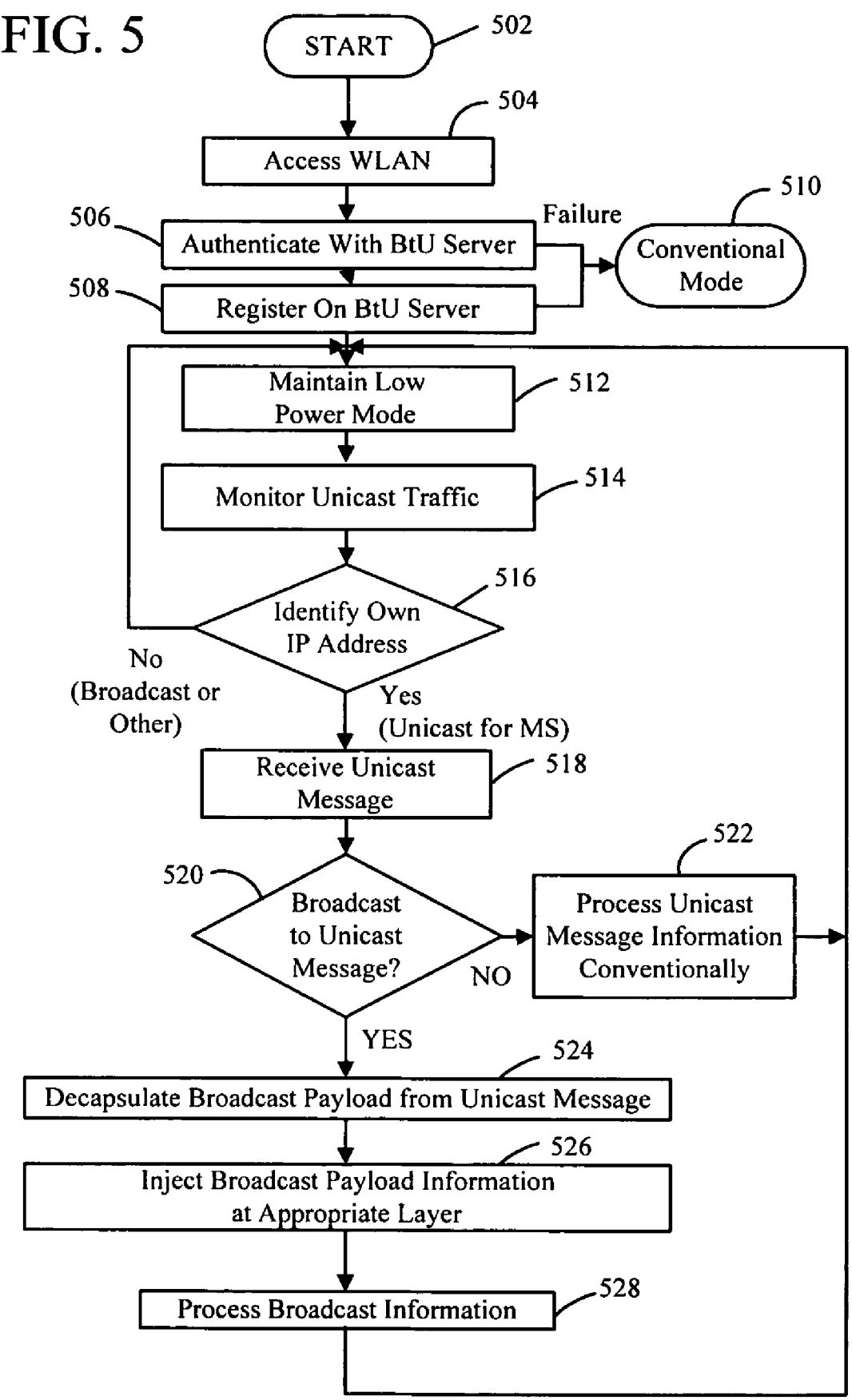
FIG. 5 is a flowchart of one illustrative method for a mobile device to conserve power and receive broadcast messages as unicast messages from the network in a Broadcast-to-Unicast (BtU) message procedure.

FIG. 5 is a flowchart of one illustrative method for a mobile device to receive broadcast messages as unicast messages from a wireless communication network (e.g. an 802.11-based wireless local area network (WLAN)). The method of FIG. 5 may be performed by the mobile device, and/or be embodied in a computer program product which includes a computer readable medium (e.g. memory) and computer instructions stored in the computer readable medium which are executable by one or more processors. The flowchart of FIG. 5 will be discussed in combination with the components of the communication system of FIG. 1. With use of the method of FIG. 5, a mobile device will operate in a low power mode more often while not becoming active during every message broadcasted by the BtU server.

In FIG. 5, the wireless network broadcast-to-unicast (BtU) procedure is initiated when the mobile communication device or mobile terminal (e.g. terminal 134 of FIG. 1) is located within a coverage area of an access point (e.g. AP 132 of FIG. 1) of a communication network (e.g. private network 104 of FIG. 1) having an 802.11-based WLAN. When the mobile terminal is operating, it searches for APs within its coverage range. Beginning at a start block 502 of FIG. 5, the mobile terminal will successfully access the WLAN through an AP (e.g. AP 132 of FIG. 1) (step 504 of FIG. 5). Once the mobile terminal has gained access to the WLAN, and assuming the mobile terminal is equipped with the proper programming needed to decode BtU messages, the mobile terminal will be authenticated by the BtU server (e.g. BtU server 128 of FIG. 1) (step 506 of FIG. 5). In general, authentication involves verifying that the mobile terminal is permitted to utilize the BtU service provided by the BtU server, to receive and decode BtU messages. Any one of several authentication techniques may be utilized in step 506, such as password authentication.

If the mobile terminal is permitted to utilize the BtU server, where the authentication steps are executed correctly and successfully, the mobile terminal will then attempt to register with the BtU server (step 508 of FIG. 5). Registration with the BtU server at least involves providing an indication or request to the BtU server to operate to receive and process BtU messages. Registration may also involve or require the mobile terminal to send its required message or protocol types for broadcast messages that it needs to process. Note that a BtU server database (e.g. FIG. 1) is utilized for storing identifications of mobile terminals of the WLAN in association with their respective message or protocol types for broadcast messages that are required to be received and processed by them. Table 1, which will be described in detail later below, reveals an example database list associated with several mobile terminals ("clients"), where each mobile terminal is associated with one or more particular SNAP types.

If either authentication or registration with the BtU server fails, then the mobile terminal will operate in a conventional mode which does not involve the BtU server (step 510 of FIG. 5). On the other hand, if the mobile terminal successfully authenticates and registers with the BtU server, the mobile terminal will begin operation in a programmed receiver mode that allows only unicast messages to be received. Here, the mobile terminal refrains from operating to receive and process standard broadcast messages and instead operates in a low power mode. Such receiver mode may be an endless loop operation, as shown in FIG. 5. Thus, the mobile terminal places its receiver in a low power mode of operation (step 512 of FIG. 5).

In some applications, this type of low power mode is referred to as a receiver "sleep" mode. Low power mode is an operating condition where selected circuit blocks are disabled or powered down until needed as one method of conserving battery power of the mobile terminal. During low power mode, some circuit blocks will be active in order to detect radio signals and other signaling, if necessary. Although many mobile terminals utilize some type of low power mode for operation, mobile terminals of the present application extend their low power mode during those times that broadcast messages would otherwise be received and processed.

The receiver within the mobile terminal will remain in low power mode until a unicast message is detected on the receiving channel (step 514 of FIG. 5). Once a unicast message is detected, the receiver within terminal will be powered on to identify if the unicast message is intended for the mobile terminal (step 516 of FIG. 5). Identifying whether the message is intended for the mobile terminal involves attaching a MAC and IP address to each unicast message and configuring the mobile terminal to compare the MAC and IP address of the received message with its own MAC and IP address. The mobile terminal will accept the message if the addresses are a match, but otherwise reject the message when the addresses are not a match. If the unicast message is not intended for the mobile terminal, programming within memory or a microcontroller device within the mobile terminal will instruct the receiver within the mobile terminal to resume its low power mode at step 512. If the unicast message is intended for the mobile terminal, and is successfully identified by the mobile terminal receiver and its associated circuitry and programming code, the mobile terminal will operate to receive and decode the unicast message (step 518 of FIG. 5).

Once the unicast message has been received, the next step for the receiver operation is to determine if the unicast message is a broadcast-to-unicast (BtU) message or if it is simply a standard unicast message that is intended for the mobile terminal (step 520 of FIG. 5). If the unicast message is a standard unicast message, the mobile terminal will process the message information in a conventional manner (step 522 of FIG. 5). If the message is a BtU message, as may be indicated by the presence of a unique message format in the form of a header or some other indicator, then the mobile terminal proceeds to process the BtU message in steps 524, 526, and 528.

The mobile terminal decapsulates the unicast message to reveal the underlying broadcast payload information (step 524 of FIG. 5), injects the broadcast payload information at the appropriate protocol layer (step 526 of FIG. 5), and subsequently processes the broadcast information as if it were received as a broadcast message (step 528 of FIG. 5). Regardless of whether or not the unicast message received is a BtU message or a conventional unicast message, after the message information is processed, the next step is to switch back to low power mode and wait for any other unicast message (step 512 of FIG. 5). The flowchart in FIG. 5 shows a continuous loop operation to repeat the steps in FIG. 5. Although it is not shown in this flowchart, the loop operation could be terminated by a manual switch or programming choice within the mobile device or by powering down all circuits within the mobile device.

Preferably, the mobile terminal makes specific use of a Delivery Traffic Information Map (DTIM) period defined in 802.11 networks for achieving low power operation throughout steps 512, 514, and 516 of FIG. 5. The DTIM period specifies how often the mobile terminal will exit its sleep cycle to receive broadcast messages. Some conventional networks specify that the DTIM period should be configured to a very low value (e.g. 100 ms), which undesirably increases mobile terminal power consumption. In the present application, however, after successfully registering with the BtU server in step 508 of FIG. 5, the mobile terminal effectively sets the DTIM period to "infinity" and therefore does not wake up to receive any broadcast messages. Other settings may be possible to achieve low power consumption.

Figure 6:
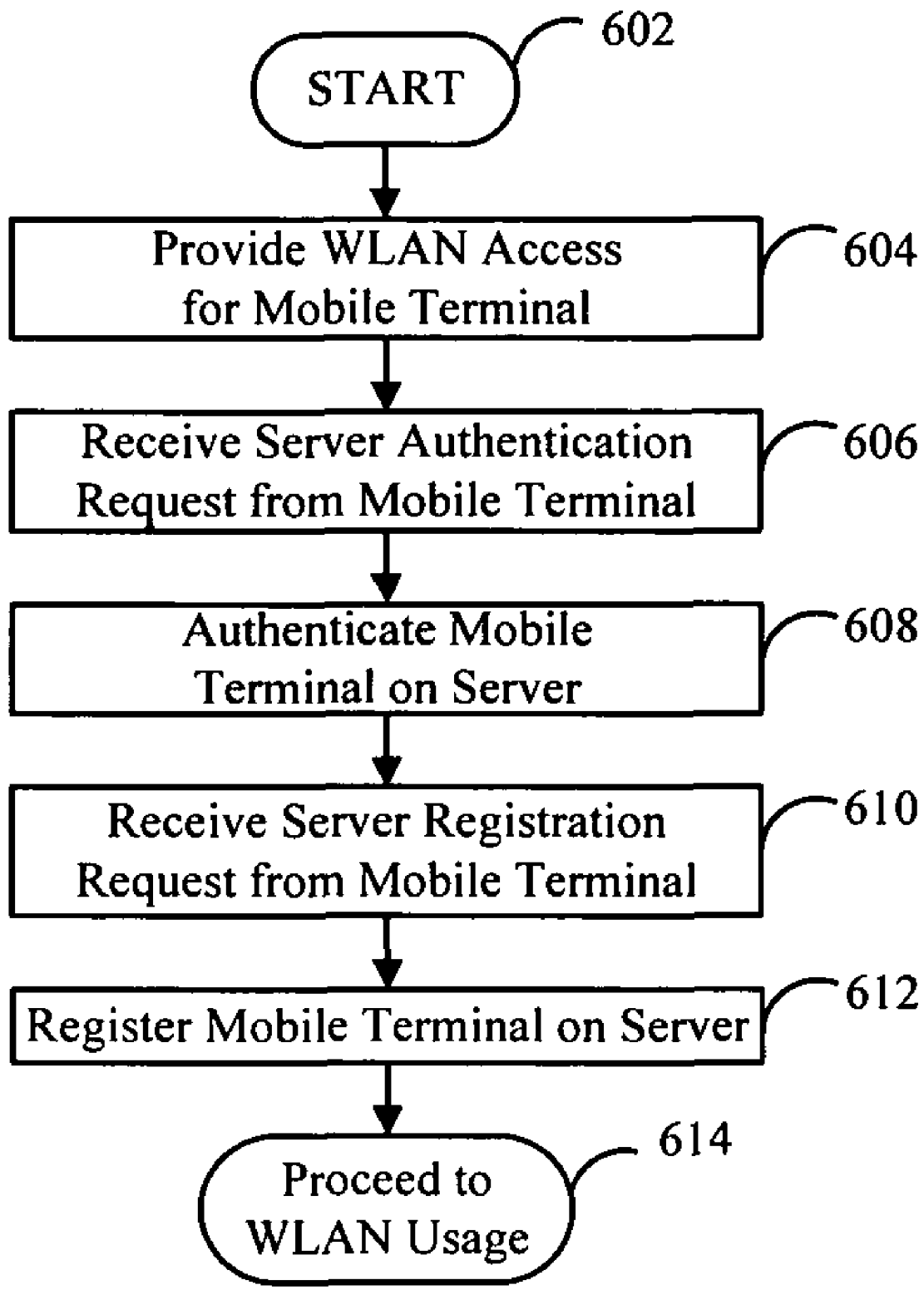
FIG. 6 is a flowchart of a configuration technique for authentication and registration with a BtU server in the network by a mobile terminal.

FIG. 6 is a flowchart for describing an illustrative configuration procedure for establishing the BtU service for a mobile terminal. This procedure occurs prior to operation described in relation to FIGS. 5 and 7. The method of FIG. 6 may be performed by the BtU server of the WLAN, and/or be embodied in a computer program product which includes a computer readable medium (e.g. memory) and computer instructions stored in the storage medium which are executable by one or more processors.

Beginning at a start block 602 of FIG. 6, the mobile device gains access to the WLAN through an access point (AP) of the WLAN (step 604 of FIG. 6). Association, authentication, and other related processes for establishing WLAN communications are well-documented procedures within 802.11 standards, and will be apparent to those skilled in art of WLAN techniques and practices. Upon gaining access to the WLAN, the mobile terminal is configured to identify a preference to operate in the low power mode using the BtU service and stores an address of the BtU server of the WLAN. At some point in time, the BtU server receives an authentication request from the mobile terminal to gain permission to use its BtU service (step 606 of FIG. 6). If the mobile terminal provides the BtU server with the proper authentication information (e.g., appropriate password, key code, etc.), then the mobile terminal is positively authenticated by the BtU server so that it may utilize the BtU server (step 608 of FIG. 6).

Next in FIG. 6, the BtU server receives a registration request from the authenticated mobile terminal in order to activate the BtU service (step 610 of FIG. 6). Registration steps may include the action of the mobile terminal providing identification information that will be used by the BtU server to deliver BtU messages. Identification information may include the mobile terminal MAC address, IP address, the required message types (e.g., IP, ARP, EAPOL, etc.), as well as any other pertinent identifying information pertaining to the mobile terminal. If the registration request is received and accepted, then the mobile device is positively registered to receive BtU messages from the WLAN (step 612 of FIG. 6). Upon approving authentication and registration to the requesting mobile terminal, the configuration procedure will conclude and normal WLAN operations will commence (step 614 of FIG. 6).

Table 1 below is an example of information that may be stored by the BtU server in the BtU server database upon registration (e.g. in relation to step 612 of FIG. 6). As mentioned above, each client name (column 1 of Table 1) and identification information of the mobile terminal (such as MAC address and/or IP address or other) is stored in association with each message or protocol type that is needed for the mobile terminal. This is done for each mobile terminal operating in the WLAN. Message types include ARP, IP, EAPOL, Intel, NetBIOS, to name but a few. Again, the example in Table 1 shows one possible way to store client information in a BtU server database.

TABLE 1

Example of a BtU Server Client Database List.

| Client # | MAC Address | IP Address | Message or Protocol Type | BtU Conversion? |
|---|---|---|---|---|
| A | 111222333001 | 111.111.111.001 | ARP, IP, EAPOL | Yes |
| B | 111222333005 | 111.111.111.005 | NetBIOS | No |
| C | 111222333006 | 111.111.111.006 | ARP, IP | Yes |
| D | 111222333010 | 111.111.111.00A | EAPOL | Yes |
| E | 111222333015 | 111.111.111.00F | ARP, IP | Yes |
| F | 111222333017 | 111.111.111.011 | ARP, IP | Yes |
| G | 111222333024 | 111.111.111.018 | NetBIOS | No |
| H | 111222333026 | 111.111.111.01A | Intel | No |
| I | 111222333032 | 111.111.111.020 | ARP, IP, EAPOL | Yes |

The BtU server database may also include information about the registration status or availability of the mobile terminal ("BtU Conversion?"). In the example of Table 1, if a mobile terminal has registered with the BtU server, then it is configured to receive BtU messages and the database will contain a "Yes" entry in the "BtU conversion?" column. After the mobile terminal successfully registers with the BtU server, the mobile terminal will operate in the low power mode and refrain from receiving broadcast messages, and receive BtU messages and convert them accordingly.

As a further technique to save processing time and to avoid re-entering BtU server information each time a mobile terminal becomes active in the WLAN, the BtU server database may retain the desired message or protocol types of the mobile terminal even after the mobile terminal has left the WLAN. When the mobile terminal leaves the WLAN, the BtU server will mark the registration status column with a "No" entry in the "BtU conversion" column and will refrain from converting broadcast messages to unicast messages for the mobile terminal during its unavailability.

Figure 7:
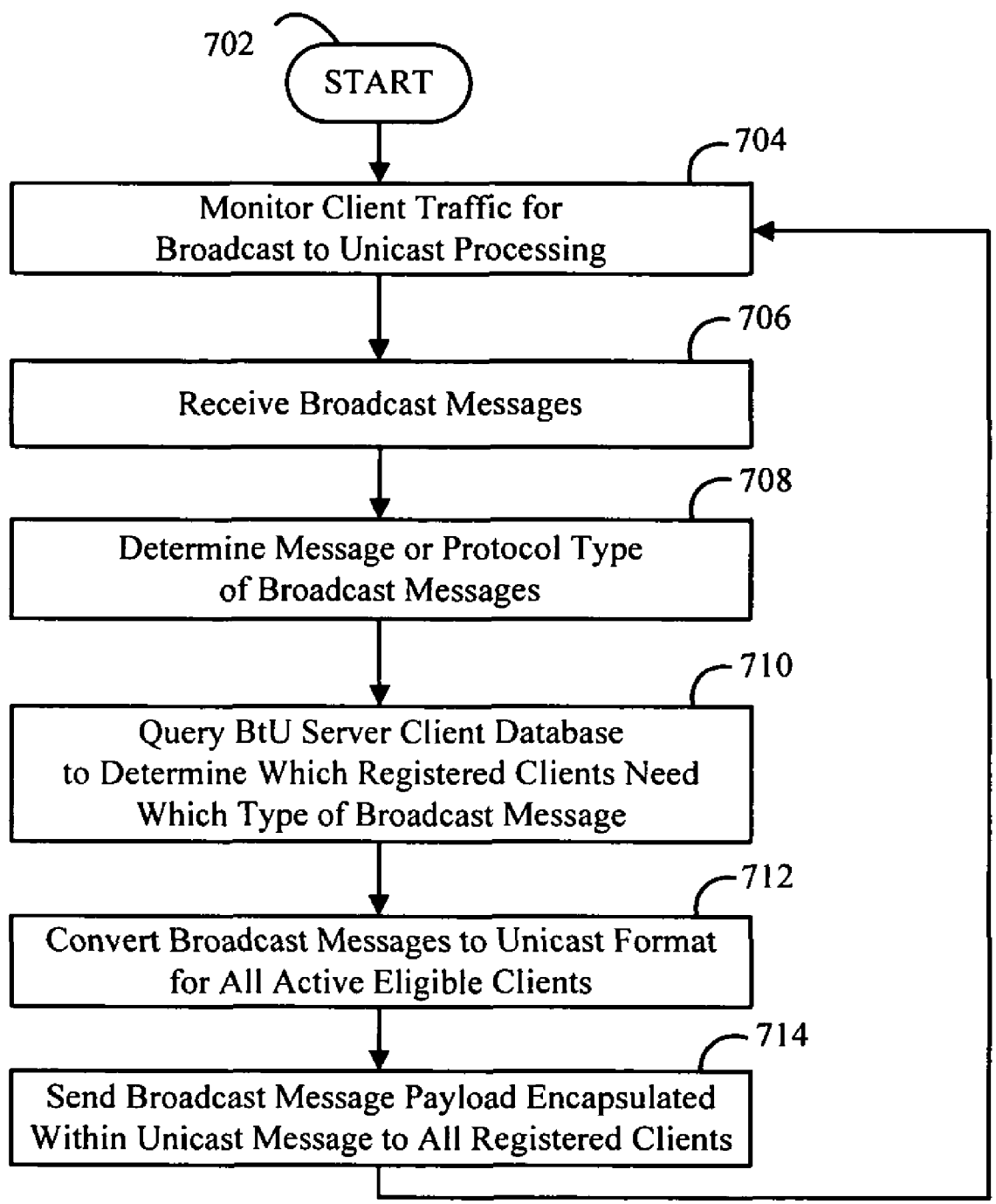
FIG. 7 is a flowchart of a BtU message procedure for the BtU server for sending broadcast information in unicast messages.

FIG. 7 is a flowchart of one illustrative method for a wireless communication network (e.g. an 802.11-based wireless local area network (WLAN)) to send broadcast messages as unicast messages for a mobile device. The method of FIG. 7 may be performed by the WLAN and/or BtU server of the WLAN, and/or be embodied in a computer program product which includes a computer readable medium (e.g. memory) and computer instructions stored in the storage medium which are executable by one or more processors.

Beginning at a start block 702 of FIG. 7, a BtU server of the WLAN monitors traffic for broadcast messages (step 704 of FIG. 7). The broadcast messages may be received at the BtU server through a wired or wireless network connection. Broadcast messages have a destination MAC address of "FF:FF:FF:FF:FF:FF" and therefore are discernible by the BtU server and mobile terminals. Once a broadcast message is received (step 706 of FIG. 7), the BtU server will identify the message or protocol type of the broadcast message (step 708 of FIG. 7). Next, the BtU server queries its BtU server database to determine which registered clients need this type of broadcast message information (step 710 of FIG. 7). A query to the BtU server database may be based on the identified message or protocol type of the current broadcast message, with a query response that returns one or more identifications of mobile terminals that are required to receive and process such broadcast information.

After identifying the message or protocol type of the broadcast message, and identifying which registered clients need such type of broadcast message, the BtU server will convert the broadcast message into a unicast message(s) directed to the identified mobile terminal(s) (step 712 of FIG. 7). Conversion of broadcast messages into unicast message may be performed by removing the broadcast message payload and inserting it into a unicast message format, which is performed for each identified active client registered with the BtU server client database. Finally, the BtU server will send the broadcast message payload, encapsulated within a unicast message, to all active clients registered on the WLAN BtU server (step 714 of FIG. 7). The flowchart in FIG. 7 shows a continuous loop operation once the BtU message processing begins. Although it is not shown in this flowchart, the continuous loop operation could be terminated by a manual switch or a received message, or by powering down all circuits within the mobile device.

Thus, methods and apparatus for use in reducing power consumption in battery-powered mobile communication devices in wireless local area networks (WLANs) have been described. In one illustrative example, a mobile device in a WLAN is configured to normally refrain from receiving broadcast messages so that it may remain in a low power mode of operation. A network server is configured to convert broadcast messages into unicast messages for receipt by the mobile device only if the message or protocol type of the broadcast message is one in which the mobile device needs to process. As the mobile device is still configured to receive unicast messages, it will receive and decode such a unicast message and process the broadcast information within it accordingly. Advantageously, battery power is conserved at the mobile device.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method for use in reducing power consumption in a mobile communication device configured to communicate in a wireless communication network which includes one or more wireless access points, the method comprising the acts of:
    sending, from the mobile communication device to a wireless communication network, a message which indicates a plurality of different protocol types of broadcast messages to be processed as broadcast-to-unicast messages for the mobile communication device during a low power mode of operation, said indicated protocol types including an Internet Protocol (IP) type, and wherein the protocol type of a given broadcast message is defined in a protocol identifier field of the broadcast message;
    during the low power mode of operation:
        controlling a wireless receiver of the mobile communication device to remain powered down during all broadcasts of broadcast messages from the one or more wireless access points of the wireless communication network; and
        for each broadcast message of each said indicated protocol type as defined in the protocol identifier field which is broadcasted from the one or more wireless access points during the low power mode of operation: monitoring to receive, through the wireless receiver, a unicast message from the wireless communication network, and identifying broadcast message information of the broadcast message within the unicast message.

2. The method of claim 1, further comprising the acts of:
    for each broadcast message of a protocol type that is different from any one of said indicated protocol types:
        failing to receive any unicast message having broadcast message information of the broadcast message.

3. The method of claim 1, wherein a broadcast message of at least one of said indicated protocol types is to be processed at other mobile communication devices operating in the wireless communication network.

4. The method of claim 1, wherein the act of identifying the broadcast message information within the unicast message comprises the further act of decapsulating the unicast message to identify the broadcast message.

5. The method of claim 1, wherein the protocol type of a given broadcast message is defined in a protocol identifier field of a sub network access protocol (SNAP) header of the broadcast message, and wherein said indicated protocol types in the message are SNAP types.

6. The method of claim 1, further comprising the act of:
    processing an instruction in response to the broadcast message information.

7. The method of claim 1, wherein the mobile communication device operates in accordance with IEEE 802.11 and the wireless communication network comprises a wireless local, area network (WLAN).

8. The method of claim 1,
    wherein the message comprises a registration message which includes said indicated protocol types within the message.

9. The method of claim 1, wherein said indicated protocol types in the message include an Address Resolution Protocol (ARP) type.

10. The method of claim 1, wherein the message having said indicated protocol types excludes an indication of a network basic input/output system (NetBIOS) type, and the act of controlling the wireless receiver comprises controlling the wireless receiver to remain powered down during all broadcasts of broadcast messages of the NetBIOS type.

11. The method of claim 8, wherein the message having said indicated protocol, types excludes an indication of a network basic input/output system (NetBIOS) type, and the act of controlling the wireless receiver comprises controlling the wireless receiver to remain powered down during all broadcasts of broadcast messages of the NetBIOS type.

12. The method of claim 1, wherein the message having said indicated protocol types excludes an indication of an Intel type, and the act of controlling the wireless receiver comprises controlling the wireless receiver to remain powered down during all broadcasts of broadcast messages of the Intel type.

13. A mobile communication device configured to communicate in a wireless communication network which includes one or more wireless access points, the mobile communication device comprising:
a wireless receiver;
a wireless transmitter;
one or more processors coupled to the wireless receiver and the wireless transmitter;
the one or more processors being operative to:
cause a message to be sent to the wireless communication network via the wireless transmitter, the message indicating a plurality of different protocol types of broadcast messages to be processed as broadcast-to-unicast messages for the mobile communication device during a low power mode of operation, said indicated protocol types including an Internet Protocol (IP) type, and wherein the protocol type of a given broadcast message is defined in a protocol identifier field of the broadcast message;
during the low power mode of operation:
controlling the wireless receiver to remain powered down during all broadcasts of broadcast messages from the one or more wireless access points of the wireless communication network; and
for each broadcast message of each said indicated protocol type as defined in the protocol identifier field which is broadcasted from the one or more wireless access points during the low power mode of operation: receive, through the wireless receiver, a unicast message from the wireless communication network, and identify broadcast message information of the broadcast message within the unicast message.

14. The mobile communication device of claim 13, wherein the one or more processors are further operative to:
for each broadcast message of a protocol type that is different from any one of said indicated protocol types:
fail to receive any unicast message having broadcast message information of the broadcast message.

15. The mobile communication device of claim 13, wherein a broadcast message of at least one of the indicated protocol types is to be processed at other mobile communication devices operating in the wireless communication network.

16. The mobile communication device of claim 13, wherein the one or more processors are operative to identify the broadcast message information within the unicast message by decapsulating the unicast message to identify the broadcast message.

17. The mobile communication device of claim 13, wherein the protocol type of a given broadcast message is defined in a protocol identifier field of a sub network access protocol (SNAP) header of the broadcast message, and wherein said indicated protocol types in the message are SNAP types.

18. The mobile communication device of claim 13, wherein the one or more processors are further operative to process an instruction in response to the broadcast message information.

19. The mobile communication device of claim 13, which operates in accordance with IEEE 802.11 and wherein the wireless communication network comprises a wireless local area network (WLAN).

20. The mobile communication device of claim 13, wherein the one or more processors are further operative to set a DTIM period to infinity for the low power mode of operation.

21. The mobile communication device of claim 13, wherein said indicated protocol types in the message include an Address Resolution Protocol (ARP) type.

22. The mobile communication device of claim 13, wherein the message having said indicated protocol types excludes an indication of a network basic input/output system (NetBIOS) type, and the one or more processors are further operative to control the wireless receiver by controlling the wireless receiver to remain powered down during all broadcasts of broadcast messages of the NetBIOS type.

23. The mobile communication device of claim 20, wherein the message comprises a registration message which includes said indicated protocol types within the message.

* * * * *

UNITED STATES PATENT AND TRADEMARK OFFICE
CERTIFICATE OF CORRECTION

PATENT NO. : 7,953,457 B2
APPLICATION NO. : 11/413880
DATED : May 31, 2011
INVENTOR(S) : Salomone et al.

It is certified that error appears in the above-identified patent and that said Letters Patent is hereby corrected as shown below:

Title Page, Item 75 (Inventors), change "Sivasithambaresa" to --Sivasithambaresan--.

Signed and Sealed this
Seventeenth Day of January, 2012

David J. Kappos
*Director of the United States Patent and Trademark Office*